United States Patent Office 3,499,711
Patented Mar. 10, 1970

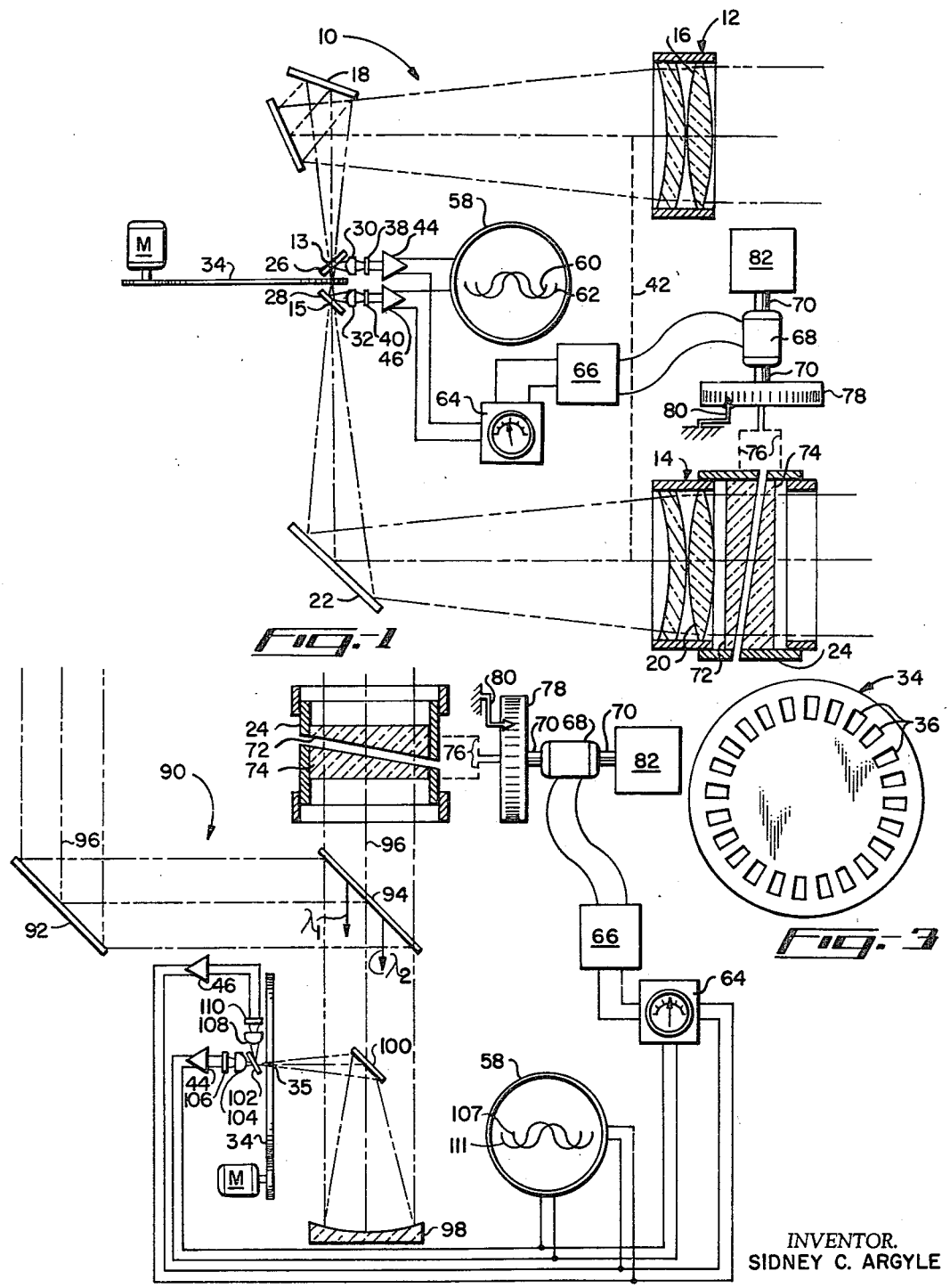

3,499,711
PASSIVE-AUTOMATIC RANGE FINDER
Sidney C. Argyle, Glendora, Calif., assignor to Aerojet-General Corporation, Azusa, Calif., a corporation of Ohio
Filed Apr. 16, 1962, Ser. No. 188,924
Int. Cl. G01c 3/08
U.S. Cl. 356—5                                    13 Claims This invention relates to a ranging device and more particularly to a passive and automatic infrared range finder.

As described in co-pending patent application, Ser. No. 188,929, filed simultaneously herewith and now abandoned, and assigned to the same assignee as the present invention, a passive and automatic range finder has been developed which operates equally well in the visual and infrared spectra so that the range finder has a wide field of use for both civil and military purposes. The range finder or ranging mechanism described in the above-identified patent application is both accurate and sensitive. However, the range finder employs two separate optical systems each with separate focal points in spaced relation to each other on a rotating reticle or chopper. Consequently, the reticle or chopper has to be constructed with great precision in order for the range finder to be accurate. The precision required caused the fabrication of the reticles to be exacting and expensive.

What is needed, therefore, and comprises an important object of this invention, is to provide a passive automatic range finder which operates efficiently without requiring a highly precise and expensive reticle.

The invention in its broadest aspect comprises a passive automatic range finder utilizing twin optical systems wherein the focal point of each optical system under certain conditions is at the same point on an optical chopper or reticle. The radiation received by each optical system passes through the chopper onto separate radiation-sensitive elements. With this arrangement, the images viewed by each optical system may be chopped simultaneously so that the output of each radiation responsive elements. With this arrangement, the images viewed by each optical system may be chopped simultaneously so that the output of each radiation responsive element is a pulsating signal. The local points of each optical system shift in accordance with the range of a radiation emitting target causing a variation in the phase between the pulsating signals. Hence the phase difference is a measure of the range.

This and other objects of this invention will become more apparent when understood in the light of the specification and the accompanying drawings wherein:

FIGURE 1 is a schematic diagram showing an automatic passive range finder wherein separate lens systems are designed to their focal points are at the same point on an optical chopper when viewing a radiating object at infinity.

FIGURE 2 is a modified automatic passive range finder wherein the separate optical systems utilize separate mirrors to superimpose radiation on a single focusing mirror, which in turn can focus the superimposed radiation from each lens system on a common point on an optical chopper; and FIGURE 3 is a plan view of a rotating reticle or chopper used with the automatic range finder disclosed in FIGURES 1 and 2.

Referring now to FIGURE 1 of the drawings, the passive automatic range finding device indicated generally by the reference numeral 10 comprises a first and second optical or lens system 12 and 14. Optical system 12 includes objective lenses 16 and a double mirror or penta reflector 18. Optical system 14 includes an objective lens 20, plane reflecting mirror 22, and an optical adjustment indicated generally by the reference numeral 24. The optical systems 12 and 14 also include partially reflecting, partially transmitting mirrors 26 and 28 respectively. In addition, a field lens 30 is associated with mirror 26 and a field lens 32 is associated with mirror 28 for reasons to become apparent below. An optical chopper or reticle, indicated generally by the reference numeral 34 is, in this particular embodiment, disk shaped, with a plurality of uniformly angularly spaced radially extending slots 36 extending therethrough. However, it is to be understood that the form of the optical chopper is not critical and the invention may be practiced using other kinds of reticles. The optical chopper or reticle is connected to and driven by an electro motor $m$ at a constant speed.

The objectives of optical systems 12 and 14 are selected so when they receive radiation from a target at infinity, their focal points 13 and 15 on the optical chopper are at the same point, and in the path of the slots 36 formed therein. The penta reflector or double mirror 18 is used so that the images of objects in the field of view of the optical systems 12 and 14 will be coincident in all parts of the field of view. With this arrangement, target images from each optical system will be chopped in the same direction so accuracy will not be lost when the target image is large.

In addition, the effect of the penta reflector 18 and the reflecting mirror 22 is to bend the optical axes of the optical systems 12 and 14 into coincidence. However, it is to be understood that this is not an essential requirement, and depending on the nature of the target and the size of the slots 36 in the chopping disk, the penta reflector 18 and the reflector mirror 22 could bend the optical axes of optical systems 12 and 14 so that they focus at the same point on the chopping disk but with the optical axes of each optical system adjacent the chopping disk at an angle with respect to each other. Radiation sensitive elements 38 and 40 are associated with optical systems 12 and 14 as described below.

With the optical systems described to this point, and with the chopper disk 34 positioned so a slot 36 is at the focal points of optical systems 12 and 14, radiation from a target viewed by optical system 12 is reflected from the penta reflector 18 and passing through the partially transmitting mirror 26 comes to a focus in the slot 36 in the chopping disk 34. Thereafter, the radiation passing through the disk 34 is reflected from partially reflecting mirror 28 into field lens 32 which images the entrance aperture of the objective lens 16 on the radiation sensitive element 40. Similiarly, radiation from a target viewed by the lens systems 14 is reflected by mirror 22 and passing through the partially transmitting mirror 28 comes to a focus in the slot 36 of the chopping disk 34. Thereafter, this radiation passing through the slot, is reflected off the partially reflecting mirror 26 into the field lens 30 which images the entrance aperture of the objective lens 20 onto the radiation sensitive element 38. Consequently, the radiation sensitive element 38 receives radiation from a target viewed by optical system 14 while radiation sensitive element 40 receives radiation viewed by optical system 12. When the chopper disk 34 is rotating, radiation passing through the slots is interrupted so that the radiation falling on the radiation sensitive elements 38 and 40 appears in the form of pulses of radiation causing the radiation sensitive elements to each have a pulsating output. The pulsating output from radiation sensitive element 38 is related to the radiation from a target viewed by the optical system 14 while the pulsating output from the radiation sensitive element 40 is related to the radiation from a target viewed by optical system 12.

As stated above, when an object viewed by both optical systems is at infinity, the focal points from each optical system will be at the same point on the chopping disk 34.

However, at distances closer than infinity, because of the angles subtended at the target by the base line 42 of objective lenses 16 and 20, the focal points 13 and 15 of each lens system will shift over on the chopping disk. This shift in the position of the focal points will produce a phase difference between the pulsating signals at the output of the radiation sensitive elements 38 and 40, and this difference in phase will be a measure of the distance of the target from the lens system.

The output from the radiation sensitive elements 38 and 40 is connected to amplifiers 44 and 46 respectively. The pulsating amplified output of each amplifier may be connected to a dual-beam oscilloscope 58 to provide a visual display of the pulsating signal 60 from amplifier 44 and pulsating signal 62 from amplifier 46.

Since the phase difference between the pulsating signals is a measure of the distance of the target from the optical systems, the face of the oscilloscope can be calibrated in terms of range to provide an automatic indication of the range of the target. However, this approach is not particularly accurate, and a more precise way of indicating range would be to connect the outputs of amplifiers 44 and 46 to a phase difference meter 64 where the indicator is calibrated in terms of distance.

Under some circumstances, this method of indicating the range of a target through the use of a phase difference indicator may not be sufficiently sensitive. To increase the sensitivity, the phase difference meter 64 could be used for driving a servosystem. This servosystem, in the particular embodiment shown, may include a servoselsyn transmitter 66. With this arrangement, the rotor of a selsyn transmitter would rotate in accordance with the phase difference between the pulsating signals 60 and 62. The rotation of the motor of a selsyn transmitter causes the rotor of the selsyn receiver 68 to rotate correspondingly in a manner well-known in the art.

Shaft 70 connected to the rotor of the selsyn receiver 68 is mechanically connected to the optical adjustment 24, which, in this particular embodiment, happens to consist of rotatably mounted prisms 72 and 74. The connection 76 between the shaft 70 of the selsyn receiver 68 and the prisms 72 and 74 is such that the prisms are caused to rotate in opposite directions when the selsyn receiver shaft 70 rotates in response to a signal from the selsyn transmitter 66.

This rotation of the prisms 72 and 74 has the effect of shifting the focal point 15 of optical system 14 along the chopping disk 34, thereby varying the phase difference between the pulsating signals 60 and 62 produced by the radiation sensitive elements 38 and 40. Consequently, when the distance of a target viewed by optical systems 12 and 14 is less than infinity, some rotative position of prisms 72 and 74 will restore the phase difference between pulsating signals 60 and 62 to zero again. The servoselsyn transmitter 66 and the phase difference meter 64 are connected in a manner well-known in the art so that the selsyn transmitter 66 receives a signal only so long as there is a phase difference between the pulsating signals 60 and 62, and the direction of rotation of the rotor of the selsyn receiver 68 and the shaft 70 causes the prisms 72 and 74 to rotate until the phase difference between the pulsating signals 60 and 62 is again zero. When this happens, the phase difference meter or indicator 64 no longer sends any signal to the selsyn transmitter 66. The rotative position of the prisms 72 and 74 which restore the phase difference of the pulsating signals 60 and 62 to zero is a measure of the distance of the target from optical systems 12 and 14. This rotative position is related to the rotative position of shaft 70 of the selsyn receiver 68. Hence the rotative position of shaft 70 is also a measure of the distance of the target from the optical systems 12 and 14. To provide a method of measuring the rotative position of shaft 70, a calibrated drum 78 is attached thereto. A fixed pointer 80 is positioned so it cooperates with the graduations on the surface of the drum 78. If these graduations are in terms of distance, the distance of the target from the optical systems 12 and 14 will be automatically indicated by the graduations indicated by pointer 80.

Since the rotative position of shaft 70 is a measure of the distance of the object or target from the optical systems 12 and 14, the shaft 70 of the selsyn receiver 68 can be mechanically connected to various kinds of ranging devices 82, such as the lens focus of a television camera or aiming devices for guns or missiles.

The range finder shown in FIGURE 1 of the drawings is both accurate and efficient. However, it does require objective lenses 16 and 20 to be carefully matched to avoid the introduction of errors. The precision required for matching the lenses is exacting and time consuming. In contrast, the range finder, indicated generally by the reference numeral 90 in FIGURE 2 of the drawings avoids the need for precisely matching objective lenses, by substituting a plane mirror 92 and a dichroic mirror 94 for objective lenses 16 and 20 shown in FIGURE 1. These mirrors are disposed in spaced parallel relationship to each other, and at an angle to the principal optical axis 96 of the range finder. The dichroic plane mirror 94 has optical characteristics such that it is reflective only to a first band of radiation indicated by the symbol $\lambda_1$, while it is transmissive of only a second band of radiation, indicated by the symbol $\lambda_2$.

If the target is in the field of view of mirrors 92 and 94, radiation from the target falling on mirror 92 will be reflected to the dichroic mirror 94, and if this radiation contains radiation in frequency band $\lambda_1$, only $\lambda_1$ will be reflected from the surface of the dichroic mirror 94, as indicated by arrow $\lambda_1$. If the target is directly in the field of view of the dichroic mirror 94, all radiation from the target falling on the surface of the mirror will be reflected from the surface of the dichroic mirror with the exception of a frequency band of radiation, designated $\lambda_2$. The radiation $\lambda_1$ from mirror 92 and $\lambda_2$ from mirror 94 is superimposed on the primary spherical mirror 98. This radiation is in turn reflected from the surface of mirror 98 to a plane reflecting mirror 100 and from there to a reticle or chopping device, which, in the particular embodiment shown, is the chopping disk 34 described in connection with the embodiment shown in FIGURE 1.

The curvature of mirror 98 is selected so that when radiation from the target falls on mirrors 92 and 94, when the target is at infinity with respect to the spherical mirror 98, the radiation frequency band $\lambda_1$, from mirror 92 and the radiation frequency band $\lambda_2$ passing through mirror 94 will be at a common focal point 35 on the surface of the chopping disk. If the chopping disk is so positioned that a slot 36 is at the focal point of the mirror 98 the radiation will pass through the slot.

On the opposite side of the chopping disk 34 is a second dichroic mirror 102. Since the only radiation reflected from spherical mirror 98 is in the frequency bands $\lambda_1$ and $\lambda_2$ and if the dichroic mirror 102 has the same spectral characteristics as the dichroic mirror 94, the radiation in the frequency band $\lambda_1$ will be reflected from the surface of mirror 102 and will pass through a field lens 108 falling on a radiation-sensitive element 110. At the same time, radiation from the spherical lens mirror 98 containing the frequency band $\lambda_2$ will pass through the dichroic mirror 102 to the field lens 104 falling on the radiation-sensitive element 106. In this way, a separation of the frequency bands is obtained.

With this arrangement, when the target is at infinity with respect to the spherical mirror 98, the focal points of the radiation from band $\lambda_1$ and radiation from band $\lambda_2$ will coincide at a common point on the chopping disk 34. When the target is at a distance closer than infinity, focal points on the chopping disk will separate.

As disk 34 rotates, the radiation passing through the slots 36 in disk 34 will be interrupted. This will cause radiation falling on radiation-sensitive elements 106 and 110 to be interrupted so that they emit pulsating output signals 107 and 111 respectively. When the target is at infinity, these pulsating signals will be in phase. However, when the target is at a distance less than infinity, the shift in the focal point of each radiation band on the chopping disk will produce a difference between the phase of the pulsating signals. This difference in phase will be a measure of the target range.

These pulsating signals may be amplified by amplifiers 44 and 46 described in connection with the embodiment shown in FIGURE 1. The remainder of the apparatus, including the oscilloscope 58, the phase difference indicator 64, the servoselsyn transmitter 66, and the selsyn receiver 68 correspond exactly in function and in operation to the apparatus described in connection with FIGURE 1 of the drawing. Hence, these parts of the apparatus have been given the same numerical designation to indicate identity of structure and function.

It is apparent, as described in connection with FIGURE 1, that the embodiment of the range finder described in FIGURE 2 could be used to indicate the range of an object emitting infrared radiation by the simple expedient of selecting the dichroic mirrors and the radiation responsive elements so they can operate in the infrared region. Alternatively, by a proper choice of the dichroic mirror and radiation-responsive elements, the same range finding equipment could be used in the visual spectrum for non-military applications.

I claim:
1. A range finder, comprising:
   first means for receiving radiation along a first path from a target, the range of which is to be determined;
   second means for receiving radiation from the target along a second path different from the first path;
   a radiation chopper disposed to receive radiation from the first and from the second means, the radiation from the first and second means being focused at the same point on the chopper when the target is at infinity;
   radiation sensitive means for receiving the radiation from the chopper and converting it into corresponding electric siganls; and
   phase detection means fed by the signals from the radiation sensitive means whereby the phase of the signals obtained is representative of the range of the target.

2. A range finder as in claim 1, wherein there is further provided adjustable focusing means disposed in the path of the radiation of at least one of the first and second means, such that the adjustment necessary to bring the phase of the signals produced for a given target to zero serves to indicate the range to the target.

3. An apparatus of the class described comprising first and second lens systems, a chopping disk associated with said lens systems, said first and second lens systems designed so the focal point of each lens system is at the same point on said chopping disk on opposite surfaces thereof when receiving radiation from an object at infinity, whereby said radiation is simultaneously chopped, a half silvered mirror in front of the opposite surfaces of said chopping disk in the optical path of said first and second lens systems, whereby radiation received by said first and second lens systems passes through said half silvered mirrors and said chopping disk, radiation responsive elements associated with the first and second half-silvered mirrors whereby radiation passing through said chopping disk and reflecting on said half silvered mirrors is directed to said radiation responsive elements whereby each radiation responsive element produces a pulsating signal from radiation received by one of the lens systems, said lens systems and said chopping disk positioned in such a way that when both lens systems are viewing an object at infinity, the phase difference between the pulsating signals on said first and second radiation responsive elements will be zero, and for an object viewed by said lens systems at distances less than infinity, the focal points of said lens systems will shift over said chopping disk in accordance with the distance of the object causing a corresponding change in the phase relationship between said pulsating signals so the phase difference between the pulsating signals is a measure of the distance of the object from said lens systems.

4. The apparatus described in claim 3 including an optical adjusting means associated with at least one of said lens systems, said optical adjusting means adapted to shift the focal point of said one lens system over said chopping disk whereby for an object at any distance from said first and second lens systems, said optical adjusting means can cause the phase difference between said pulsating signals to become zero, whereby the setting of said optical adjusting means is a measure of the distance of the object from said first and second lens systems.

5. The apparatus described in claim 4 including an oscilloscope connected to said first and second radiation responsive elements to provide a visual display of the phase difference between said first and second pulsating signals, a phase difference responsive means connected to said first and second radiation responsive elements, a servomechanism connected between said phase difference responsive means and said optical adjusting means whereby said servomechanism automatically actuates said optical adjusting means until the phase difference between the pulsating signals caused by a radiating object in the field of view of said first and second lens systems is zero, said optical adjusting means calibrated in terms of distance whereby said apparatus provides an automatic indication of the distance of the object viewed from said apparatus.

6. The apparatus set forth in claim 3 wherein said lens systems and said radiation responsive elements are optimized for reception of infrared radiation.

7. An apparatus of the class described comprising first and second optical systems in spaced relation to each other, chopping means associated with said optical systems, means for focusing radiation from the object as viewed by said first optical system and radiation from the object as viewed by said second optical system onto said chopping means, whereby said radiation is simultaneously chopped and converted into first and second pulsating signals corresponding to radiation from said first and second optical systems, said first and second optical systems positioned so when a radiating object at infinity is in the field of view of each optical system, the phase difference between said pulsating signals is zero and for an object viewed by said optical systems at distances less than infinity, the phase relationship between the pulsating signals will change in accordance with the distance of the object from said optical systems.

8. An apparatus of the class described comprising a first mirror and a dichroic mirror, said dichroic mirror selected so it reflects only a first narrow radiation band and transmits a second narrow radiation band, said first mirror and said dichroic mirror disposed in spaced parallel relationship to each other, a focusing mirror positioned so its optical axis is at an angle to said dichroic mirror whereby a first narrow radiation band from radiation falling on said first mirror and reflected to said dichroic mirror, is again reflected by said dichroic mirror onto said focusing mirror, and a second narrow radiation band from radiation falling on said dichroic mirror is transmitted by said dichroic mirror onto said focusing mirror and superimposed onto said first narrow radiation band, chopping means at the focal point of said focusing mirror for converting the superimposed first and second narrow radiation bands from said first mirror and said dichroic mirror into corresponding pulsating signals, the first mirror, the dichroic mirror, the focusing mirror, and the chopping means positioned so when radiation from an object at infinity is reflected by said first mirror and transmitted by said dichroic mirror, the phase difference between said corresponding pulsating signals will be zero, and for an object viewed at a distance less than infinity, the focal points of said superimposed radiation bands on said chopping means will shift over said chopping means in accordance with the distance of the object, causing a corresponding change in the phase relationship between the said pulsating signals, so the phase difference between said pulsating signals is a measure of the distance of the object from said dichroic mirror.

9. The apparatus as set forth in claim 8 including an adjustment means positioned in front of said dichoic mirror so that the focal point of said second narrow radiation band reflected by said focusing mirror can be shifted over said chopping means, whereby said adjustment means can shift the focal point of said second narrow radiation band over said chopping means until the phase difference between said pulsating signals is zero, so that the setting of said adjustment means is a measure of the distance of said object from said dichroic mirror.

10. An apparatus of the class described comprising a first mirror and a dichroic mirror, said dichroic mirror selected so it reflects only a first narrow radiation band and transmits only a second narrow radiation band, said first mirror and said dichroic mirror disposed in spaced parallel relationship to each other, a focusing mirror positioned so its optical axis is at an angle to said second dichroic mirror whereby a first narrow radiation band from radiation falling on said first mirror is reflected by said dichroic mirror onto said focusing mirror and a second narrow radiation band from radiation falling on said dichroic mirror is transmitted by said dichroic mirror onto said focusing mirror and superimposed on said first narrow radiation band, a reflecting mirror in the optical path of said focusing mirror and positioned to reflect the superimposed radiation bands reflected by said focusing mirror so the focal point of said focusing mirror occurs outside the optical region between said dichroic mirror and said focusing mirror, chopping means at the focal point of said focusing mirror for converting the superimposed first and second narrow radiation bands from said first mirror and said dichroic mirror into corresponding pulsating signals, means for causing pulses of the said superimposed first and second narrow radiation bands passing through said chopping means to move in different directions, first and second radiation responsive elements positioned to receive said separated pulsating signals whereby said first radiation responsive element receives pulsating signals originating only from the radiation reflected by said first mirror, and said second radiation responsive element receives pulsating signals originating only from the radiation transmitted by said dichroic mirror, the first mirror and the dichroic mirror, the focusing mirror, and the chopping means positioned so when radiation from an object at infinity is reflected by said first mirror and transmitted by said dichroic mirror, the phase difference between said resulting pulsating signals will be zero, and for a radiation object at a distance less than infinity, the focal points of said superimposed radiation bands on said chopping means will shift over said chopping means in accordance with the distance of the object, causing a corresponding change in the phase difference between said pulsating signals so the phase relationship between said pulsating signals is a measure of the distance of the object from said first mirror and said dichroic mirror.

11. The apparatus set forth in claim 10 including an adjustment means positioned in front of said dichroic mirror so that the focal point of said second radiation band reflected by said focusing mirror can be shifted over said chopping means, whereby said adjustment means can shift the focal point of said second narrow radiation band over said chopping means until the phase difference between said pulsating signals is zero, so that the setting of said adjustment means is a measure of the distance of said object from said first mirror and said dichroic mirror.

12. The apparatus described in claim 11 including an oscilloscope connected to said first and second radiation response elements for providing a visual display of the phase difference between said pulsating signals, a phase difference responsive means connected to said first and second radiation responsive elements, a servomechanism connected between said phase difference responsive means and said adjustment means whereby said servomechanism automatically actuates said adjustment means until the phase difference between said pulsating signals is zero, said adjustment means calibrated in terms of distance whereby the reading of said adjustment means when the phase difference of said pulsating signals has been set equal to zero is the distance of the object from said first mirror and said dichroic mirror.

13. The apparatus set forth in claim 12 wherein said first and second narrow radiation bands are in the infrared region whereby the apparatus is a passive infrared radiation range finder.

References Cited

UNITED STATES PATENTS 2,524,807  10/1950  Kallmann _____ 356—4

VERLIN R. PENDEGRASS, Primary Examiner